United States Patent
Yoon et al.

(10) Patent No.: US 10,151,388 B2
(45) Date of Patent: Dec. 11, 2018

(54) METHOD FOR CONTROLLING TRANSMISSION FOR VEHICLE

(71) Applicant: Hyundai Motor Company, Seoul (KR)

(72) Inventors: Young Min Yoon, Suwon-si (KR); Seong Hwan Cheong, Hwaseong-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 400 days.

(21) Appl. No.: 15/041,854

(22) Filed: Feb. 11, 2016

(65) Prior Publication Data
US 2017/0089457 A1     Mar. 30, 2017

(30) Foreign Application Priority Data
Sep. 24, 2015 (KR) .................. 10-2015-0135299

(51) Int. Cl.
| | |
|---|---|
| F16H 61/18 | (2006.01) |
| F16H 61/10 | (2006.01) |
| F16H 61/02 | (2006.01) |
| F16H 59/18 | (2006.01) |
| F16H 61/688 | (2006.01) |

(52) U.S. Cl.
CPC ......... *F16H 61/18* (2013.01); *F16H 61/0204* (2013.01); *F16H 61/10* (2013.01); *F16H 59/18* (2013.01); *F16H 61/688* (2013.01)

(58) Field of Classification Search
CPC ...... F16H 59/18; F16H 61/0204; F16H 61/10; F16H 61/16; F16H 61/18; F16H 61/688
See application file for complete search history.

(56) References Cited

U.S. PATENT DOCUMENTS

| | | | | |
|---|---|---|---|---|
| 7,308,837 | B2 * | 12/2007 | Miyazaki | F16H 61/16 192/3.63 |
| 7,392,721 | B2 * | 7/2008 | Pollak | F16D 48/062 74/330 |
| 8,892,320 | B2 * | 11/2014 | Yoon | F16H 59/50 701/55 |
| 2006/0112777 | A1 * | 6/2006 | Miyazaki | F16H 61/16 74/339 |
| 2014/0114541 | A1 * | 4/2014 | Yoon | F16H 59/50 701/55 |

FOREIGN PATENT DOCUMENTS

| | | |
|---|---|---|
| JP | 2006-153173 | 6/2006 |
| JP | 2009047223 | 3/2009 |
| JP | 2011-179604 | 9/2011 |

(Continued)

*Primary Examiner* — Ramya P Burgess
*Assistant Examiner* — David R Morris
(74) *Attorney, Agent, or Firm* — Brinks Gilson & Lione

(57) ABSTRACT

A method for controlling a transmission for a vehicle includes: sensing, by a controller, an opening degree of an accelerator pedal; checking, by the controller, a gear stage engaged with an input shaft, with which a Reverse (R) gear and a second gear of a Dual-Clutch Transmission (DCT) are engageable, if the opening degree of the accelerator pedal is less than or equal to a reference value as a result of the sensing; and controlling, by the controller, the vehicle in a parking mode in which disengagement of the R gear is prevented if the R gear is engaged with the input shaft as a result of the checking.

9 Claims, 5 Drawing Sheets

(56) References Cited

FOREIGN PATENT DOCUMENTS

| KR | 10-2011-0024793 | 3/2011 |
| KR | 10-2011-0105636 | 9/2011 |
| KR | 20120133959 | 12/2012 |
| KR | 20140046856 | 4/2014 |
| KR | 101438616 | 9/2014 |

* cited by examiner

FIG. 2

| GEARSHIFT POSITION | PARKING MODE | | DRIVING MODE | |
|---|---|---|---|---|
| | ODD-NUMBERED STAGE | EVEN-NUMBERED STAGE | ODD-NUMBERED STAGE | EVEN-NUMBERED STAGE |
| P | 1 | R | 1 | R |
| R | 1 | R | 1 | R |
| N | 1 | R | 1 | 2 |
| D | 1 | R | 1 | 2 |

METHOD FOR CONTROLLING TRANSMISSION FOR VEHICLE

CROSS REFERENCE TO RELATED APPLICATION

The present application claims the benefit of and priority to Korean Patent Application No. 10-2015-0135299, filed Sep. 24, 2015, the entire contents of which is incorporated herein by reference.

FIELD

The present disclosure relates to a method for controlling a transmission for a vehicle.

BACKGROUND

Recently, various types of Automated Manual Transmissions (AMT) or Dual-Clutch Transmissions (DCT), which can simultaneously achieve the driving convenience of an automatic transmission and high fuel efficiency and power efficiency of a manual transmission, have been developed.

Generally, a vehicle equipped with a DCT may be driven and the speed of the vehicle may be changed by operating a clutch after the completion of gear shifting. In particular, after the range of a gearshift has completely changed to a reverse (R) range due to fail-safe control, a reverse (R)-gear is engaged, and thereafter the clutch is operated. That is, when the range of the gearshift changes to the R range, the R-gear is engaged, and then the clutch is operated, with the result that a delay in a driving response occurs.

Further, a vehicle equipped with a DCT performs a pre-selecting operation that disengages the R gear from a non-driven output shaft and that engages a second gear with the non-driven output shaft, during forward driving. Therefore, we have discovered that in R-D and D-R lurch driving modes, a problem arises in that driving response is delayed and excessive noise is caused due to the frequent repetition of engagement/disengagement of the R gear.

The foregoing is intended merely to aid in the better understanding of the background of the present disclosure, and is not intended to mean that the foregoing or the present disclosure falls within the purview of the related art that is already known to those skilled in the art.

SUMMARY

Accordingly, the present disclosure has been made and provides a method for controlling a transmission for a vehicle, which can prevent the occurrence of noise and the deterioration of driving response attributable to the engagement/disengagement of an R gear in a lurch driving situation in which reverse driving and forward driving are repeated at low speed.

The present disclosure provides a method for controlling a transmission for a vehicle, including: sensing, by a controller, an opening degree of an accelerator pedal; checking, by the controller, a gear stage engaged with an input shaft, with which a Reverse (R) gear and a second gear of a Dual-Clutch Transmission (DCT) are engageable, if the opening degree of the accelerator pedal is less than or equal to a reference value as a result of the sensing; and controlling, by the controller, the vehicle in a parking mode in which disengagement of the R gear is prevented if the R gear is engaged with the input shaft as a result of the checking.

The parking mode may be a mode in which engagement of the R gear with the input shaft is maintained even if a range of the gearshift changes to a Neutral (N) range or a Drive (D) range.

The method may further include controlling, by the controller, the vehicle in a driving mode that prepares for engagement of the second gear if the opening degree is greater than the reference value as a result of the sensing.

The method may further include controlling, by the controller, the vehicle in a driving mode that prepares for engagement of the second gear if the R gear is not engaged with the input shaft as a result of the checking.

The method may further include, before sensing the opening degree, determining, by the controller, whether the gear stage engaged with the input shaft, with which the R gear and the second gear of the DCT are engageable, is the second gear; and performing, by the controller, the sensing if the second gear is not engaged with the input shaft as a result of the determination.

The method may further include controlling, by the controller, the vehicle in a driving mode that prepares for engagement of the second gear if the second gear is engaged with the input shaft as a result of the determination.

The driving mode may be a mode in which the second gear is engaged with the input shaft when a range of the gearshift changes to an N range or a D range.

In accordance with a method for controlling a transmission for a vehicle, having the above-described configuration, when a vehicle equipped with a DCT performs lurch driving, the engagement of the R gear is maintained according to the status of the vehicle, thus improving the problems such as the occurrence of noise and slow driving response attributable to the frequent engagement/disengagement of the R gear.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above and other objects, features and advantages of the present disclosure will be more clearly understood from the following detailed description taken in conjunction with the accompanying drawings, in which:

FIG. 2 illustrates a table showing gear engagement forms in respective vehicle modes according to an embodiment of the present disclosure;

DETAILED DESCRIPTION

Figure 5:
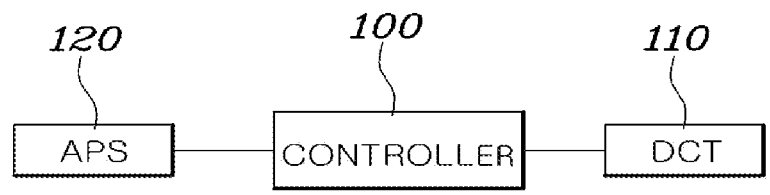
FIG. 5 is a block diagram showing an apparatus for controlling a transmission for a vehicle according to an embodiment of the present disclosure.

Hereinafter, a method for controlling a transmission for a vehicle according to embodiments of the present disclosure will be described in detail with reference to the attached drawings. The following description is merely exemplary in nature and is not intended to limit the present disclosure, application, or uses. It should be understood that throughout the drawings, corresponding reference numerals indicate like or corresponding parts and features First, FIG. 5 is a block diagram showing an apparatus for controlling a transmission for a vehicle according to an embodiment of the present disclosure. Referring to FIG. 5, a controller 100 may check the status of engagement of the gear stage of a Dual Clutch Transmission (DCT) 110, and may sense the opening degree of an accelerator pedal via an Acceleration Pedal Sensor (APS) 120. The detailed operations and functions of respective components will be described in detail later.

Figure 1:
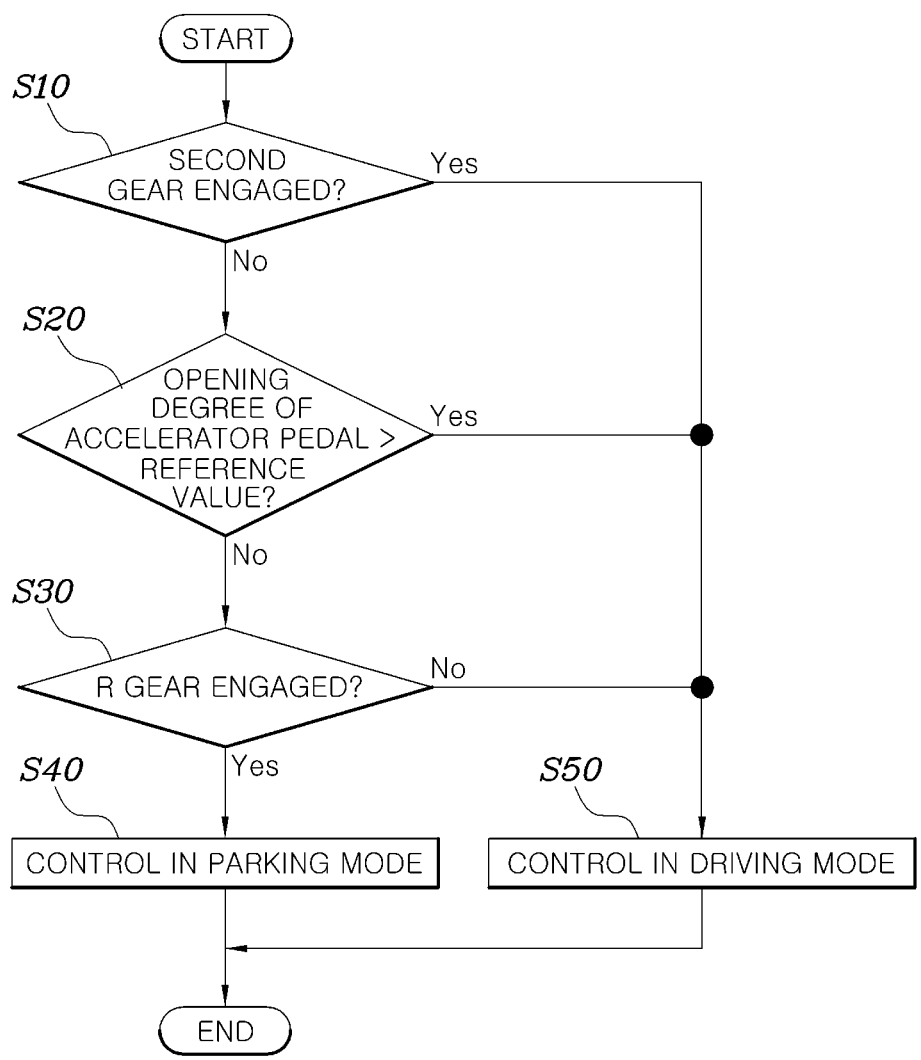
FIG. 1 is a flowchart showing a method for controlling a transmission for a vehicle according to an embodiment of the present disclosure.

FIG. 1 is a flowchart showing a method for controlling a transmission for a vehicle according to an embodiment of the present disclosure. Referring to FIG. 1, the vehicle transmission control method may include the step S20 of the controller sensing the opening degree of an accelerator pedal; the step S30 of, if the opening degree of the accelerator pedal is less than or equal to a reference value, as a result of the sensing at step S20, the controller checking a gear stage engaged with an input shaft with which the R gear and the second gear of a DCT can be engaged; and the step S40 of, if the R gear is engaged with the input shaft as a result of the checking at step S30, the controller controlling the vehicle in a parking mode in which the disengagement of the R gear is prevented.

First, the controller 100 senses the opening degree of the accelerator pedal as a method for determining whether a driver has intention to reverse his or her vehicle. That is, the opening degree of the accelerator pedal is sensed by the APS of the vehicle, and the sensed opening degree of the accelerator pedal is compared with a reference value.

If the opening degree of the accelerator pedal is less than or equal to the reference value, it is determined that the driver does not have intention to accelerate the vehicle, and the checking step S30 is performed so as to determine whether to perform a parking mode. Here, the reference value may be a value corresponding to the opening degree of the accelerator pedal when the stroke of the accelerator pedal is 50%. That is, when the stroke of the accelerator pedal is less than or equal to 50%, it may be determined that the driver does not have intention to drive the vehicle forwards, whereas when the stroke of the accelerator pedal is greater than 50%, it may be determined that the driver has intention to drive the vehicle forwards. However, the range of the reference value may be variably set depending on the vehicle or the designer.

At the checking step S30, the input shaft with which the R gear and the second gear are engageable may be set to an input shaft for an even-numbered stage, and a gear stage engaged with the input shaft for the even-numbered stage may be checked. If the gear stage engaged with the input shaft for the even-numbered stage is the R gear, control for the parking mode in which the disengagement of the R gear is prevented at step S40.

More specifically, the parking mode may be characterized in that the engagement of the R gear with the input shaft is maintained even if the range of the gearshift has changed to a neutral (N) range or a drive (D) range.

That is, in conventional technology, when the range of the gearshift changes to the D range or the N range, the controller performs control for pre-selecting the second gear in preparation for forward driving.

However, in the present technology, the controller is configured to, when the opening degree of the accelerator pedal is less than or equal to the reference value, and the R gear is engaged with the input shaft for the even-numbered stage, determine a current situation to be the situation in which the driver will continue to reverse the vehicle, and performs control such that the status of the engagement of the R gear with the input shaft is maintained even if the range of the gearshift changes to the N range or the D range.

Accordingly, during low-speed lurch driving, noise occurring as the R gear is engaged/disengaged with/from the input shaft may be minimized and the delay of driving response attributable to the engagement/disengagement of the R gear may also be overcome.

Meanwhile, as a result of the sensing at step S20, when the opening degree is greater than the reference value, the vehicle may be controlled in the driving mode that prepares for the engagement of the second gear.

Further, as a result of the checking at step S30, when the R gear is not engaged with the input shaft, the vehicle may be controlled in a driving mode that prepares for the engagement of the second gear.

That is, when the opening degree of the accelerator pedal is greater than the reference value or when the opening degree of the accelerator pedal is less than the reference value, but the R gear is not engaged with the input shaft, the controller may determine that the driver does not have intention to continue to reverse the vehicle and then perform a driving mode.

In addition, the present technology may further include the step S10 of, before performing the sensing step S20, determining whether the gear stage engaged with the input shaft, with which the R rear and the second gear of the DCT are engageable, is the second gear. In this case, the present disclosure is characterized in that, if it is determined at step S10 that the second gear is not engaged with the input shaft, the sensing step S20 is performed.

In contrast, if it is determined at step S10 that the second gear is engaged with the input shaft, the vehicle may be controlled in a driving mode that prepares for the engagement of the second gear.

That is, the controller checks whether the second gear is engaged with an input shaft for an even-numbered stage prior to performing the sensing step S20. If it is checked that the second gear is engaged with the input shaft for the even-numbered stage, the controller determines that the driver has intention to drive the vehicle forwards, and then immediately controls the vehicle in the driving mode. In contrast, when the second gear is not engaged, the sensing step S20 is continuously performed, and thus the driver's driving intention is determined.

More specifically, the driving mode is characterized in that it is a mode in which the second gear is engaged with the input shaft when the range of the gearshift changes to the N range or the D range.

That is, in the case where the vehicle is intended to be controlled in the driving mode, the controller determines that, if the gearshift has been manipulated to the N or D range, the driver has an intention to drive the vehicle forwards and engages the second gear with the input shaft for the even-numbered stage, thus performing pre-selecting control to prepare for the driving of the vehicle in the second stage.

Figure 3:
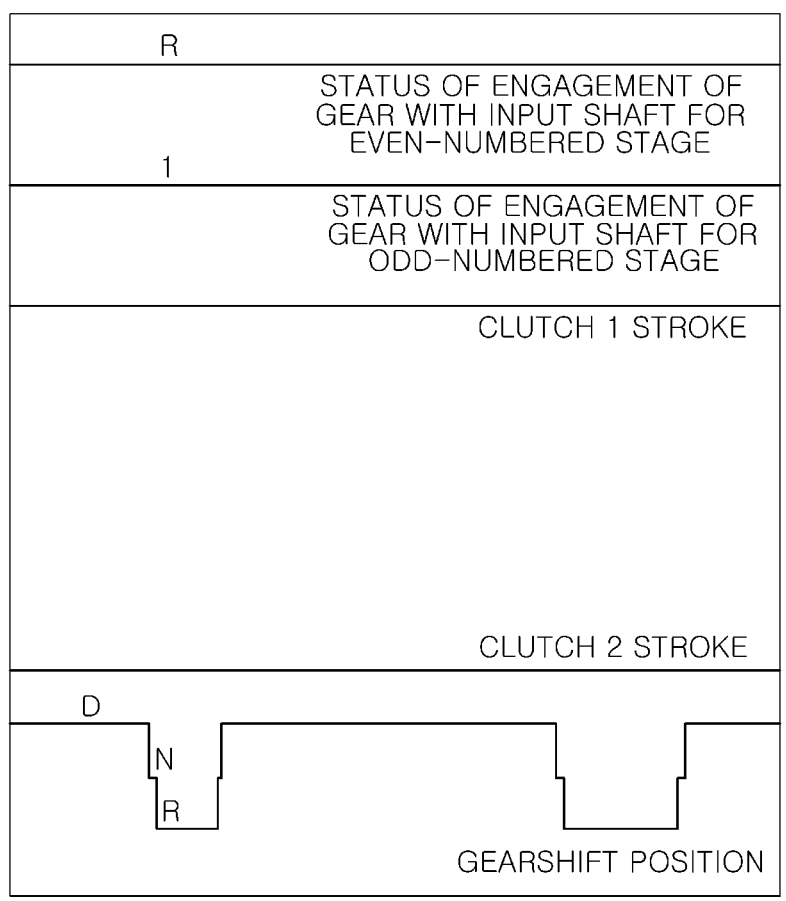
FIG. 3 is a graph showing a gear engagement state when being applied to a parking mode.
Figure 4:
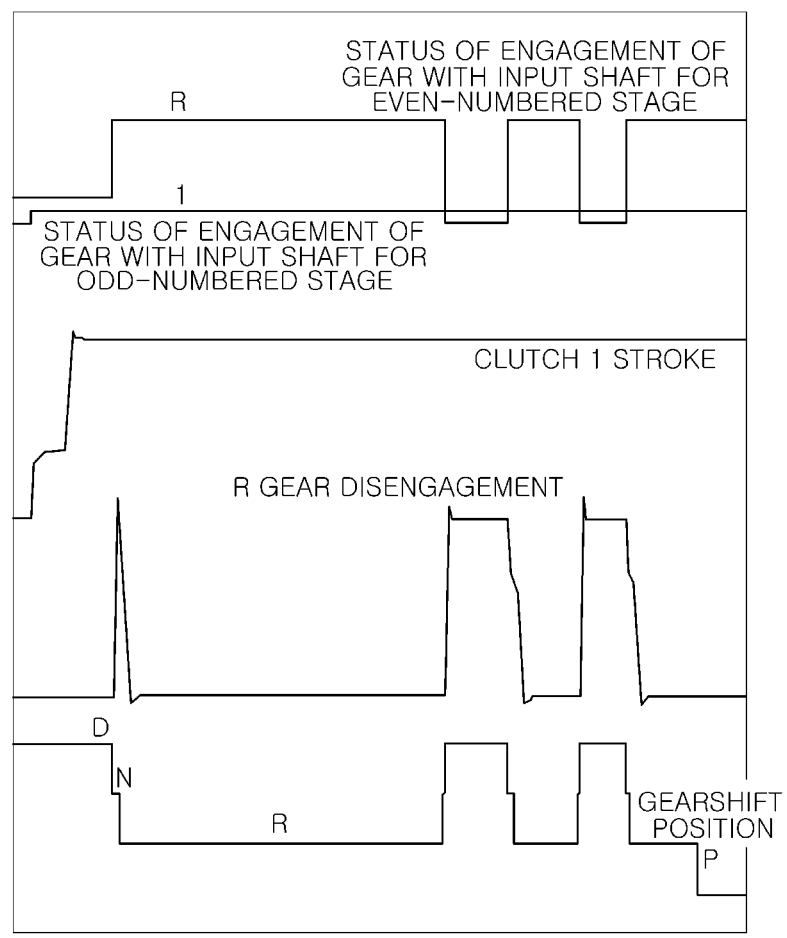
FIG. 4 is a graph showing a gear engagement state when being applied to a driving mode.

FIG. 2 is a table showing gear engagement forms in respective vehicle modes according to an embodiment of the present disclosure, FIG. 3 is a graph showing a gear engagement state when being applied to a parking mode, and FIG. 4 is a graph showing a gear engagement state when being applied to a driving mode.

Referring to FIGS. 2 to 4, if it is determined by the controller that the vehicle is to be controlled in a parking mode, the R gear is engaged with an input shaft for an even-numbered stage when the position of the gearshift falls within the N range or the D range. In contrast, if it is determined that the vehicle is to be controlled in a driving mode, the second gear is engaged with the input shaft for the even-numbered stage when the position of the gearshift falls within the N range or the D range, thus preparing for forward driving.

It can be seen in FIG. 3 that the vehicle is controlled in the parking mode, wherein, even if the position of the gearshift is changed, the status of engagement of the gear with the input shaft for the even-numbered stage and the stroke value of an even-numbered clutch are not changed. It can be seen in FIG. 4 that the vehicle is controlled in the driving mode, wherein according to the change in the position of the gearshift, the R gear is engaged/disengaged with/from the input shaft for the even-numbered stage.

In accordance with the method for controlling a transmission for a vehicle having the above-described configuration, when a vehicle equipped with a DCT performs lurch driving, the engagement of the R gear is maintained according to the status of the vehicle, thus improving the problems such as the occurrence of noise and slow driving response attributable to the frequent engagement/disengagement of the R gear.

Although these embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. A method for controlling a transmission for a vehicle, comprising:
   sensing, by a controller, an opening degree of an accelerator pedal;
   checking, by the controller, a gear stage engaged with an input shaft, with which a Reverse (R) gear and a second gear of a Dual-Clutch Transmission (DCT) are engageable, when the opening degree of the accelerator pedal is less than or equal to a reference value as a result of the sensing; and
   controlling, by the controller, the vehicle in a parking mode in which disengagement of the R gear is prevented when the R gear is engaged with the input shaft as a result of the checking.

2. The method of claim 1, wherein the parking mode is a mode in which engagement of the R gear with the input shaft is maintained during a range of the gearshift changes to a Neutral (N) range or a Drive (D) range.

3. The method of claim 1, further comprising:
   controlling, by the controller, the vehicle in a driving mode that prepares for engagement of the second gear when the opening degree is greater than the reference value as a result of the sensing.

4. The method of claim 3, wherein the driving mode is a mode in which the second gear is engaged with the input shaft when a range of the gearshift changes to an N range or a D range.

5. The method of claim 1, further comprising:
   controlling, by the controller, the vehicle in a driving mode that prepares for engagement of the second gear when the R gear is not engaged with the input shaft as a result of the checking.

6. The method of claim 1, further comprising, before sensing the opening degree:
   determining, by the controller, whether the gear stage engaged with the input shaft, with which the R gear and the second gear of the DCT are engageable, is the second gear; and
   performing, by the controller, the sensing when the second gear is not engaged with the input shaft as a result of the determination.

7. The method of claim 6, further comprising:
   controlling, by the controller, the vehicle in a driving mode that prepares for engagement of the second gear when the second gear is engaged with the input shaft as a result of the determination.

8. A method for controlling a transmission for a vehicle using a controller, the transmission including an input shaft engageable with a Reverse (R) gear and a second gear of a Dual-Clutch Transmission (DCT), the method comprising:
   checking, by the controller, a gear stage of the transmission to determine whether the R gear is engaged with the input shaft;
   sensing, by the controller, an opening degree of an accelerator pedal to determine whether the opening degree of the accelerator pedal is less than or equal to a reference value; and
   controlling, by the controller, the vehicle in a parking mode in which disengagement of the R gear is prevented when the R gear is engaged with the input shaft and the opening degree of the accelerator pedal is less than the reference value.

9. The method of claim 8, wherein the parking mode is a mode in which engagement of the R gear with the input shaft is maintained during a range of the gearshift changes to a Neutral (N) range or a Drive (D) range.

* * * * *